United States Patent
Lindner

(10) Patent No.: US 7,382,467 B2
(45) Date of Patent: Jun. 3, 2008

(54) INTERFEROMETRIC MEASURING DEVICE

(75) Inventor: Michael Lindner, Leutenbach (DE)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 10/559,168

(22) PCT Filed: Apr. 3, 2004

(86) PCT No.: PCT/DE2004/000699

§ 371 (c)(1),
(2), (4) Date: May 4, 2006

(87) PCT Pub. No.: WO2004/109226

PCT Pub. Date: Dec. 16, 2004

(65) Prior Publication Data
US 2006/0256347 A1    Nov. 16, 2006

(30) Foreign Application Priority Data
Jun. 5, 2003    (DE)    ................................ 103 25 443

(51) Int. Cl.
*G01B 11/02*    (2006.01)
(52) U.S. Cl. .................................................... 356/497
(58) Field of Classification Search ................ 356/497, 356/511, 512, 513
See application file for complete search history.

(56) References Cited

U.S. PATENT DOCUMENTS 5,684,545 A    11/1997    Dou et al.
6,086,204 A *  7/2000    Magnante ................... 351/212
6,449,048 B1   9/2002    Olszak
2003/0048532 A1 * 3/2003  Lindner et al. ............. 359/511

FOREIGN PATENT DOCUMENTS

DE    101 15 524    11/2001
DE    101 31 778    1/2003
WO    WO0214845 A1 *  2/2002

OTHER PUBLICATIONS

A. Olszak, "Lateral scanning white-light interferometer," Applied Optics, vol. 39, 3907-3913, 2000.

* cited by examiner

*Primary Examiner*—Michael A Lyons
(74) *Attorney, Agent, or Firm*—Kenyon & Kenyon LLP

(57) ABSTRACT

An interferometric measuring device for measuring the shape or profile of a surface of an object by depth scanning includes a radiation source emitting a short coherent beam, a beam splitter for forming an object beam guided by panorama optics to the object via an object light path and a reference beam guided to a reflecting reference element via a reference light path, and an image pick-up which receives the radiation reflected by the object and the reference element and brought into interference and transmits it to an evaluator for determining the surface shape. An accurate and rapid measurement of surfaces, e.g., in narrow cavities, may be accomplished relatively easily in that a reference surface oriented at an angle to the object surface is formed by the reference element, and the measuring device is configured so that the depth scanning for measuring shape is accomplished by laterally moving the object in relation to the object beam.

12 Claims, 1 Drawing Sheet

INTERFEROMETRIC MEASURING DEVICE

FIELD OF THE INVENTION

The present invention relates to an interferometric measuring device for measuring the shape or profile of a surface of an object by depth scanning.

BACKGROUND INFORMATION

An interferometric measuring device, normally referred to as a white-light interferometer, is described in published German patent document DE 101 31 778, in which the basic method of functioning of such a white-light interferometer is also described. In the case of this known interferometric measuring device, a short coherent light source is used to generate light in a customary manner, the light of the short coherent light source being split up by a beam splitter into an object beam guided via an object light path and a reference beam guided via a reference light path. The object surface to be measured is imaged on an image pick-up, e.g. a CCD camera, and superposed by the reference wave formed by the reference beam. The depth scanning may be implemented by moving a reference element that reflects the reference beam, or moving the object, relative to the measuring device. When the object is moved, the image plane of the objective and the reference plane are in the same plane. During depth scanning, the object remains fixed in the field of view of the CCD camera, and the object is only moved relative to the reference plane along the depth axis (z-direction). In this manner, measurements of industrial surfaces, for example, may be conducted with a depth resolution in the range of a few nanometers. The panorama optics and the objective described in this published German patent document also allow a measurement in narrow and deep bores, using a 360° circumferential picture of a nearly radially symmetric object, which means that valve seats, for example, may be completely measured. However, it is difficult for this interferometric measuring device to measure guide bores completely.

An interferometric measuring device suitable for deep and narrow bores and based on the principle of white light interferometry is described in published German patent document DE 100 15 878, an intermediate image being generated by the objective taking the form of an endoscope, and intermediate-image scanning being carried out for the depth scanning. During the depth scanning, the object remains fixed in the field of view of the image pick-up or the CCD camera. Using this known measuring device, it is difficult to completely measure a guide bore and, in addition, a valve seat as well.

Furthermore, it is also known that a readily accessible object surface can be measured by a so-called lateral scanning white-light interferometer, as described in A. Olszak, "Lateral scanning white-light interferometer," Applied Optics, Vol. 39, 3907-3913, 2000. In this connection, the reference plane is inclined at an angle to the object surface. For depth scanning, the object is moved laterally through the field of view of the objective in such a manner that a relative change in the optical path length between the reference light path and the object light path, i.e. between the reference arm and the object arm, results for each object point. In the case of the lateral movement, the correlogram resulting from the lateral movement is recorded and evaluated for each object point. Spatially extended objects and moving objects can be measured by this device. A measurement in narrow and deep bores, however, is not possible with this device.

An object of the present invention is to facilitate measurement of deep and narrow bores or, for example, valve seats in a rapid and reliable manner.

SUMMARY

According to the present invention, it is provided that a reference surface oriented at an angle to the object be formed by the reference element, and that the device be designed in such a manner that the depth scanning for measuring shape is accomplished by laterally moving the object in relation to the object beam. In this connection, each point of the object surface is laterally moved over the image pick-up during the depth scanning, the difference in the optical path length of the object light path and reference light path changing. Depth scanning by lateral movement of the object relative to the object beam, in combination with the panorama optics, allows object surfaces, in particular those in narrow and deep bores as well, to be measured rapidly and reliably. Only a relative movement of the object surface in the axial direction of the depression, in particular a bore, is necessary for measuring the entire object surface in the bore. By this means, guide bores may be completely measured with relative ease. Even the concentricity, i.e. the relative spatial position of a valve seat with respect to the guide bore, as well as the diameter of the bore, may be determined relatively easily with the aid of appropriate evaluation. Because of the sturdy construction and the rugged measuring operations, the measuring device is also particularly suited for use in manufacturing.

An advantageous example embodiment provides for the panoramic optics to be designed to produce a spherical wave having a center in or outside of the panoramic optics.

In this context, the measuring operations are aided in that the object surface is partially axially symmetric with respect to an object axis, that the panoramic optics are formed in one plane for imaging the surface formed in this manner, e.g., a cylinder, a cone, or a sphere, and that the panoramic optics move along the object axis during the depth scanning.

Futhermore, an example embodiment provides that the panoramic optics is designed to generate a wave front perpendicular to the object surface, contribute to a precise, reliable measurement.

In the case of measuring narrow cavities, the design and handling are also aided in that the panoramic optics may take the form of an endoscope and/or are designed to produce an intermediate image in an object arm situated in the object light path.

Depending on the measuring task, the reference element may take the form of a spherical, conical, or planar reference reflector.

The operation may also be simplified by providing the interferometer to be configured in such a manner that the object beam and the reference beam are formed in the same light path.

Example embodiments of the present invention include the image pick-up taking the form of part of a CCD camera or a CMOS camera, or of a configuration of photodiodes, and from the evaluation device being designed to only take into account the region of an interference field.

Further contributing to the accuracy of the measurement are the measures, according to which the reference surface intersects the object-surface region situated in the imaging region of the panoramic optics, at an angle to the object surface.

Further example embodiments provide for the reference surface to be spherical, having a radius that is the same as, or different from, that of the image plane, or for the reference surface to take the form of a cone or a plane.

In order to measure objects having different geometries (cylinder, cone, etc.) or different diameters or cone angles, it is advantageous to use active optical elements (AOE) (e.g. lenses having electronically adjustable focal lengths). Using these active optical elements, the image characteristics of the optical path (up to the image pick-up) and/or of the panorama optics may be adapted, prior to or during the measurement, to new geometries or geometries changing during the measurement, in order to sharply image the surfaces to be measured onto the image pick-up.

In the case of new geometries/diameters or ones that change during the measurement, it is advantageous to be able to control the reference beam path in order to improve the interferometric signals. This may be accomplished by shifting the reference reflector, in that at least one adaptive optical element or one active reflector, which may change its curvature, is used in the reference beam path.

DETAILED DESCRIPTION

Figure 1:
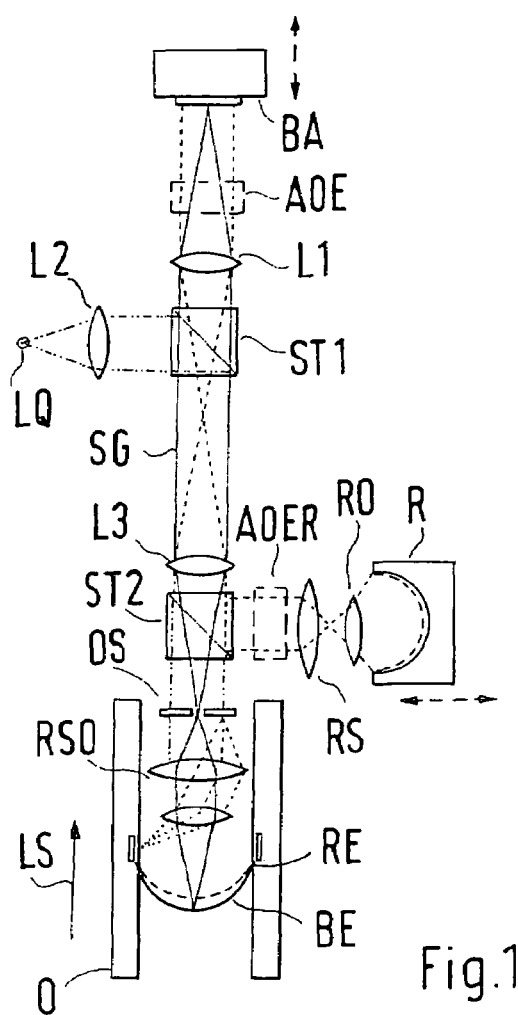
FIG. 1 shows a schematic view of an interferometric measuring device.

To produce light of a relatively large spectral width (white light), an interferometric measuring device, which is shown in FIG. 1 and functions according to the conventional white-light interferometry method, has a short coherent light source LQ having a coherence length vo of, e.g. ten μm or a few tens of μm, whose light is guided through a lens L2 to a first beam splitter ST1, and transmitted by this, via an optical path SG, to a second beam splitter ST2, which splits up the light into a reference beam RS guided to a reflecting reference element R via a reference light path and an object beam OS guided to the surface of an object O via an object light path. The light reflected by reference element R and the object surface is transmitted in turn to second beam splitter ST2, is mutually superposed, and reaches, via optical path SG and first beam splitter ST1, a further lens L1 and, for example, an inserted, active optical element AOE on an image pick-up BA, e.g. a CCD camera or a CMOS camera, and is evaluated in an evaluator connected to it, in order to determine the surface shape or characteristics associated with it.

Further optical elements having, for example, an additional lens L3 may be positioned in optical path SG. Reference optics RO having, for example, an additional active optical element AOER and further optical elements are situated in the reference light path, which is formed in a reference arm. Reference element R has, e.g. a spherical reflector, in order to form a corresponding reference surface RE in the region of the object surface to be measured.

The objective lens system is designed as panorama optics RSO. Panorama optics RSO allows a circular region of up to 360° on a surface of object O that is at least nearly radially symmetric, e.g. a guide bore, to be imaged on planar image pick-up BA provided with individual pixels. Panorama optics RSO may generate a spherical image plane BE. The surface region, which represents the surface of intersection of spherical image plane BE and the object surface (e.g. cylinder, cone, sphere, paraboloid, or the like), is sharply imaged on image pick-up BA and represents the imaging region. The imaging region may have a width of only a few hundred μm. Reference surface RE is designed to be at an angle to the surface of object O. Reference surface RE intersects the imaging region at the line of intersection of image plane BE and the object surface. Reference surface RE is spherical, as well, and has the same radius as, or a radius different from, that of image plane BE, but it may also have a different shape, e.g. conical or planar.

Figure 2:
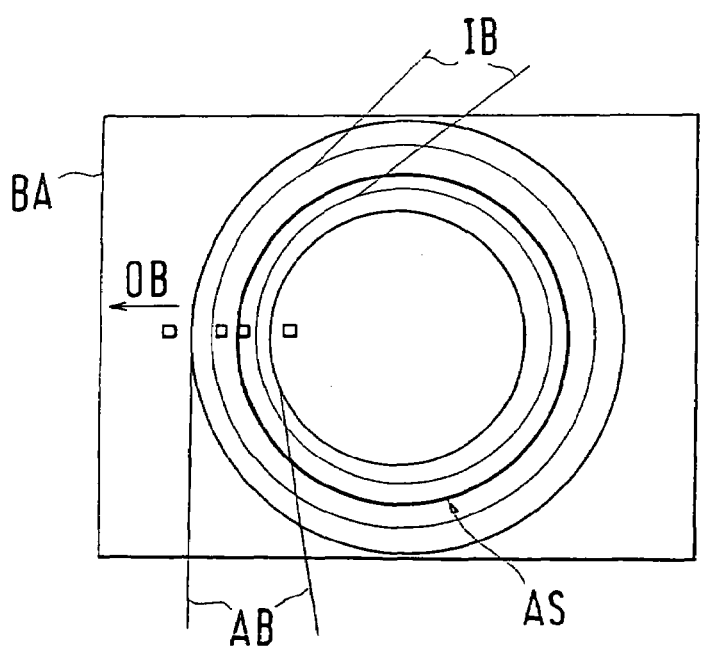
FIG. 2 shows an image of a surface region on an image pick-up of the measuring device.

The beam of an object point interferes with that of reference surface or plane RE, when the optical path difference of object beam OS in question and reference beam RS is less than the coherence length. On image pick-up BA, interference region IB (cf. FIG. 2) represents an expanded region around region of sharp image AS of imaging region AB.

For the depth scanning, object O is moved along the common axis of panorama optics RSO and object O (e.g. the axial direction of the bore).

In this context, each object point moves through the imaging region and reference surface RE. If the object point is in the center of the imaging region, it is imaged at the best lateral resolution. In this position, it is directly on reference surface RE. The object point shows maximum interference contrast. In the case of further lateral movement, the object point migrates (movement of object point OB) from the center of reference surface RE and experiences modulation of the interferences. If the object point is outside of the interference field, then it does not show any more interference. Lateral scanning movement LS in conjunction with the panorama optics allows a 360° circular region of the object surface to be imaged on image pick-up BA. Due to lateral scanning movement LS, every measuring point travels into this region and leaves it again. Inside the region, the inclination of reference surface RE with respect to the object surface causes the measuring point to experience a modulation of the interferences, through which its height may be measured. The depth scanning is accomplished in that lateral scanning movement LS of an object point causes a relative change in the optical path length between the object light path and the reference light path.

Figure 3:
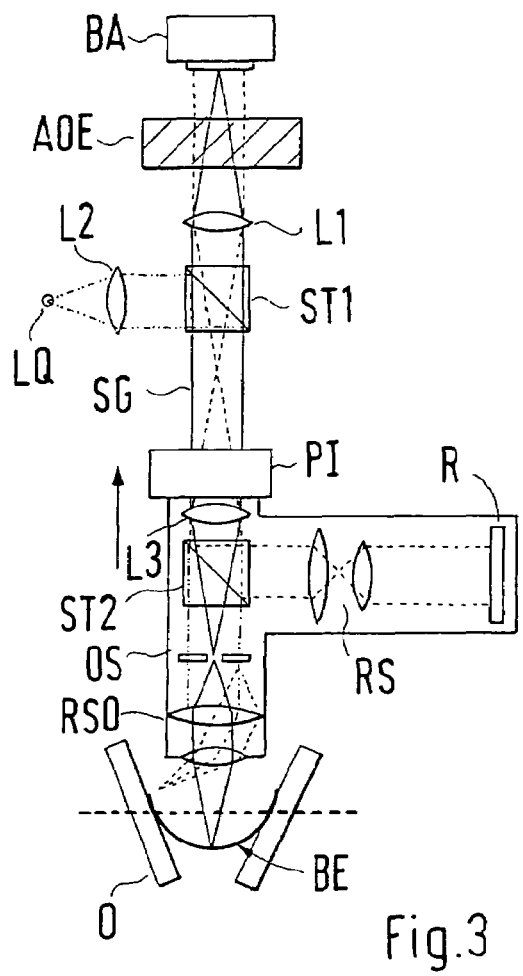
FIG. 3 shows a schematic view of a further exemplary embodiment of an interferometric measuring device.

In particular, as shown in FIG. 3, an interferometric objective having panoramic optics RSO and compensation optics in the reference arm may be attached to an adjusting element in the measuring set-up, as an interchangeable lens, e.g. in the form of a piezo mirror shifter PI. The depth scan is carried out via piezo mirror shifter PI in such a manner that a point of the object surface of, for example, a valve or valve seat moves laterally across image pick-up BA, and, in the process, the optical path difference between the object light path and the reference light path changes. This set-up has the advantage that the interferometric objective having panorama optics RS may easily be exchanged for conventional interferometric objects. An adaptive optical element AOE, which is controlled during the depth scan in order to continually form a sharp image of the valve seat at the location of the measurement, may also be used in the case of this measuring device.

The evaluator does not have to be designed for evaluating all of the pixels of planar image pick-up BA, but may be designed to only evaluate the region of the interference field, so that the processing speed for obtaining the measuring results is increased.

Through the use of panorama optics in conjunction with a method of lateral depth scanning, only a movement along the axis of the bore is necessary for measuring a complete guide bore.

Therefore, the device according to the present invention may be constructed to be simple and sturdy. Measurements of valve seats or the like are also possible. The design and the method according to the present invention allow complete guide bores to be measured in a completely accurate, rapid, sturdy, and simple manner. A use in manufacturing is possible, in which case the diameter, valve seats, and the concentricity of the valve seat and guide bore may also be measured.

What is claimed is:

1. An interferometric measuring device for determining a profile of a surface of an object by depth scanning, comprising:
    a radiation source emitting a short coherent beam;
    a beam splitter arrangement positioned in the path of the short coherent beam and forming an object beam and a reference beam;
    a panorama optics arrangement for guiding the object beam to the object via an object light path;
    a reflecting reference element;
    a reference optics arrangement for guiding the reference beam to the reflecting reference element via a reference light path;
    an image pick-up arrangement that receives beams reflected by the object and the reference element and brought into interference, wherein the image pick-up arrangement transmits signals derived from the received beams to an evaluator for determining the profile of the surface of the object; and
    at least one adaptive optical element for controlling imaging characteristics;
    wherein a reference surface oriented at an angle to the object surface is formed in the vicinity of the object surface, and wherein the depth scanning for determining the profile of the surface of the object is performed by laterally moving the object with respect to the object beam.

2. The device as recited in claim 1, wherein the panorama optics arrangement is configured to generate a spherical wave having a center that is one of in and outside of the panorama optics.

3. The device as recited in claim 2, wherein the object surface is at least partially axially symmetric with respect to an object axis, and wherein the panorama optics arrangement is formed in one plane for imaging the object surface, the object surface being configured as one of a cylinder, a cone, and a sphere, and wherein during the depth scanning, the panorama optics arrangement moves along the object axis.

4. The device as recited in claim 3, wherein the panorama optics arrangement is configured to generate a wave front perpendicular to the object surface.

5. The device as recited in claim 3, wherein the panorama optics arrangement is one of configured as an endoscope and configured for producing an intermediate image in an object arm situated in the object light path.

6. The device as recited in claim 3, wherein the reflecting reference element is one of a spherical, conical, and planar reference reflector.

7. The device as recited in claim 3, wherein the object beam and the reference beam are formed in the same light path.

8. The device as recited in claim 3, wherein the image pick-up arrangement is one of a CCD camera, a CMOS camera, and a system of photodiodes, and wherein the evaluator is configured to only take into account the region of an interference field for determining the profile of the surface of the object.

9. The device as recited in claim 3, wherein the panorama optics arrangement generates a spherical image plane, and wherein the reference surface intersects a region of the object surface situated in an imaging region of the panorama optics arrangement, at an angle to the object surface, and at a line of intersection of the spherical image plane and the object surface.

10. The device as recited in claim 3, wherein the reference surface is spherical and has a profile that is one of conical and planar.

11. The device as recited in claim 3, wherein the at least one adaptive optical element is positioned in the optical path in front of the image pick-up arrangement.

12. The device as recited in claim 3, wherein the at least one adaptive optical element is positioned in the reference light path for controlling the reference light path to adjust the reference surface.

* * * * *